(12) United States Patent
Debraal

(10) Patent No.: US 9,933,917 B2
(45) Date of Patent: Apr. 3, 2018

(54) SYSTEM AND METHOD FOR GENERATING AND NAVIGATING A BONSAI TREE HIERARCHICAL DATA STRUCTURE

(71) Applicant: Bank of America Corporation, Charlotte, NC (US)

(72) Inventor: Ryan P. Debraal, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 415 days.

(21) Appl. No.: 14/458,980

(22) Filed: Aug. 13, 2014

(65) Prior Publication Data

US 2016/0048534 A1    Feb. 18, 2016

(51) Int. Cl.
| | | |
|---|---|---|
| G06F 3/048 | (2013.01) | |
| G06F 3/0482 | (2013.01) | |
| G06F 3/0484 | (2013.01) | |
| G06F 3/0481 | (2013.01) | |
| G06F 17/30 | (2006.01) | |

(52) U.S. Cl.
CPC .......... *G06F 3/0482* (2013.01); *G06F 3/0481* (2013.01); *G06F 3/04842* (2013.01); *G06F 17/30961* (2013.01)

(58) Field of Classification Search
CPC .... G06F 9/4443; G06F 17/30728; G09G 5/14
USPC ....................... 715/781, 713, 853
See application file for complete search history.

(56) References Cited

U.S. PATENT DOCUMENTS

| | | | | |
|---|---|---|---|---|
| 5,923,330 A * | 7/1999 | Tarlton | ............. | G06F 17/30572 345/419 |
| 7,363,593 B1 * | 4/2008 | Loyens | ............. | G06F 17/30572 707/999.1 |
| 7,451,154 B2 * | 11/2008 | Solomon | ........... | G06F 17/30067 |
| 7,657,547 B1 * | 2/2010 | Huitema | ............... | G06F 3/0482 707/791 |
| 2004/0243931 A1 * | 12/2004 | Stevens | ..................... | G06F 8/38 715/236 |
| 2012/0030629 A1 * | 2/2012 | Kujda | ................... | G06F 3/0481 715/835 |
| 2012/0290946 A1 * | 11/2012 | Schrock | ............... | G06Q 10/107 715/752 |
| 2013/0061182 A1 * | 3/2013 | Weise | ................... | G06F 3/0482 715/853 |
| 2015/0339307 A1 * | 11/2015 | Hultgren | ............... | G06F 3/0481 707/724 |

* cited by examiner

Primary Examiner — Joy M Weber
(74) Attorney, Agent, or Firm — Michael A. Springs

(57) ABSTRACT

A system may include an interface, a memory, and one or more processors. The system receives data in a hierarchical nature from a memory and displays data associated with a parent. The system receives an instruction to display data associated with a child and receives the data associated with the child from the memory. The system replaces the data associated with the parent with the data associated with the child. The system also displays the data associated with a child.

17 Claims, 3 Drawing Sheets

SYSTEM AND METHOD FOR GENERATING AND NAVIGATING A BONSAI TREE HIERARCHICAL DATA STRUCTURE

TECHNICAL FIELD

This invention relates generally to a hierarchical data structure, and more specifically, to a system and method for generating and navigating a bonsai tree hierarchical data structure.

BACKGROUND

Enterprises maintain various datasets. These datasets may be organized in a hierarchical nature. Users or employees may need to navigate to various levels of the hierarchical data to find information. Currently, the ability to navigate among various levels of the hierarchical data is limited.

SUMMARY OF EXAMPLE EMBODIMENTS

According to embodiments of the present disclosure, disadvantages and problems associated with generating and navigating bonsai tree hierarchical data structures may be reduced or eliminated.

In certain embodiments, a system may include an interface, a memory, and one or more processors. The system receives data in a hierarchical nature from a memory and displays data associated with a parent. The system receives an instruction to display data associated with a child and receives the data associated with the child from the memory. The system replaces the data associated with the parent with the data associated with the child. The system also displays the data associated with a child.

Certain embodiments of the present disclosure may provide one or more technical advantages. In one embodiment, the system reduces the number of queries necessary to identify information related to a certain level, thereby saving computational resources and additional time. In one embodiment, the system allows a hovering instruction to display data associated with a level in addition to maintaining the previously-displayed hierarchy, instead of requiring the user to navigate to the separate level and replacing the information in the hierarchy. This allows for the system to more efficiently use the space on the screen to display the necessary data without requiring the user to navigate to a different level before viewing the information related to the separate level.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
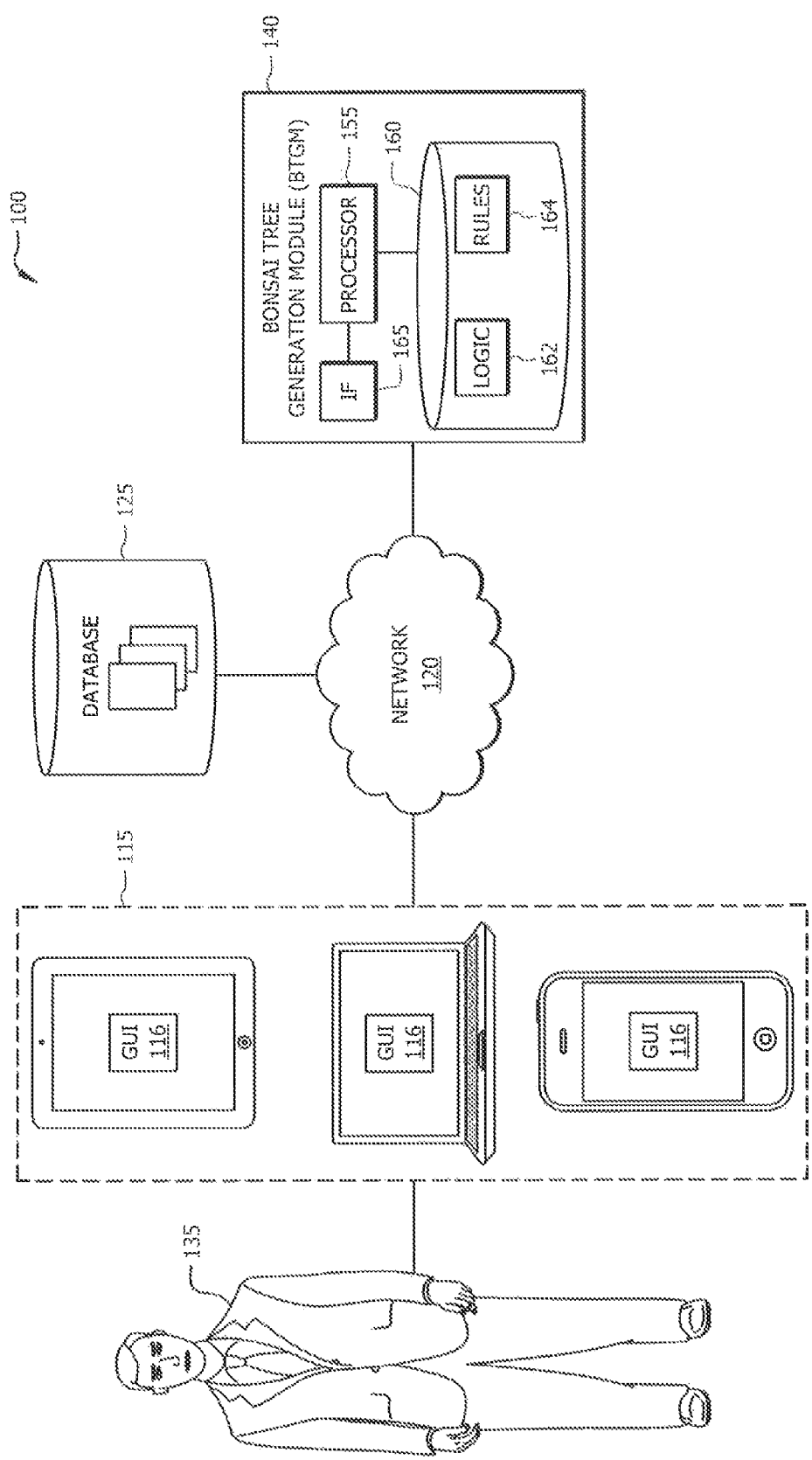
FIG. 1 illustrates an example of a system that facilitates generating and navigating a bonsai tree hierarchical data structure.
Figure 2:
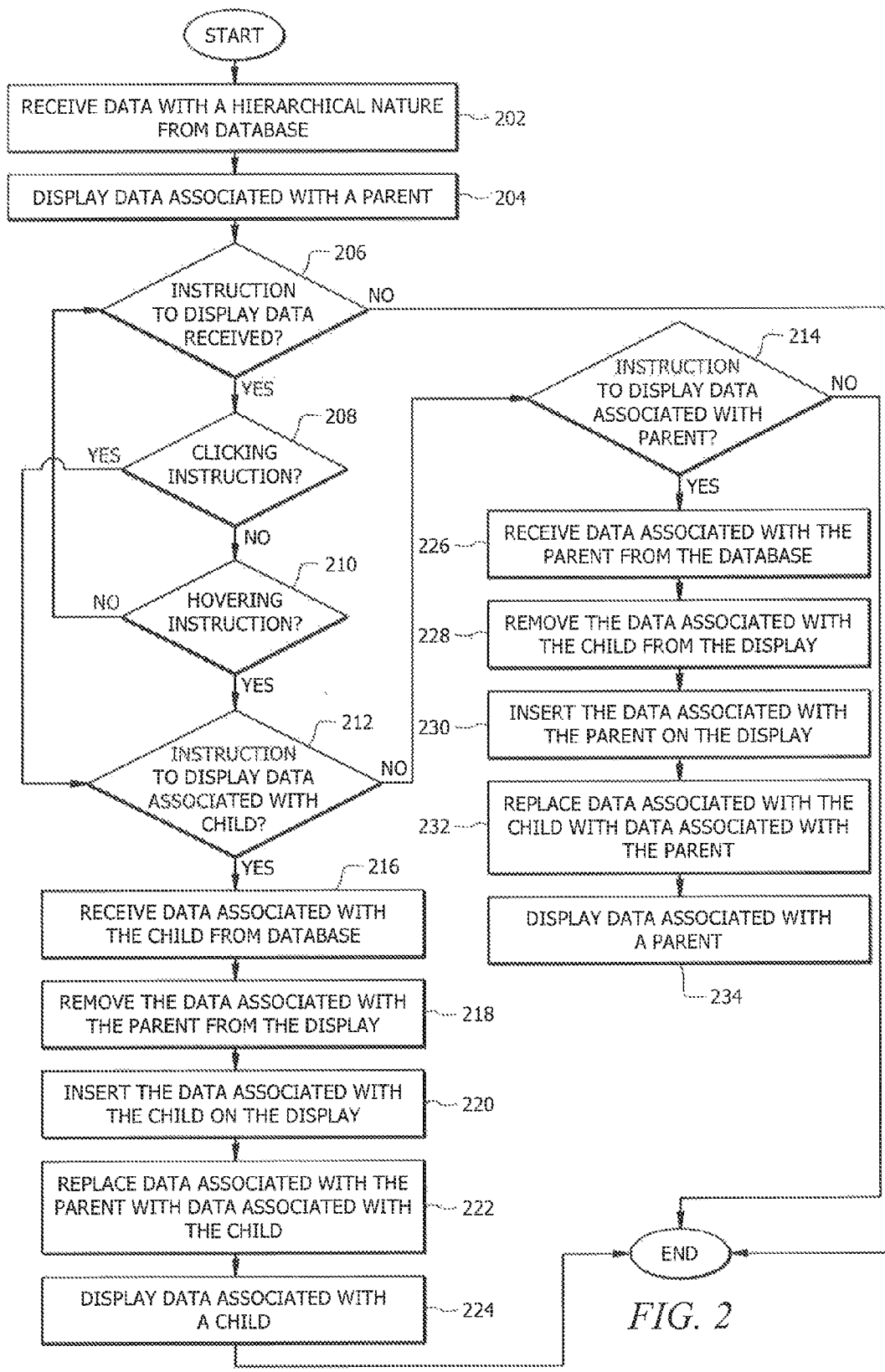
FIG. 2 illustrates an example of a flowchart that facilitates generating and navigating a bonsai tree hierarchical data structure.
Figure 3:
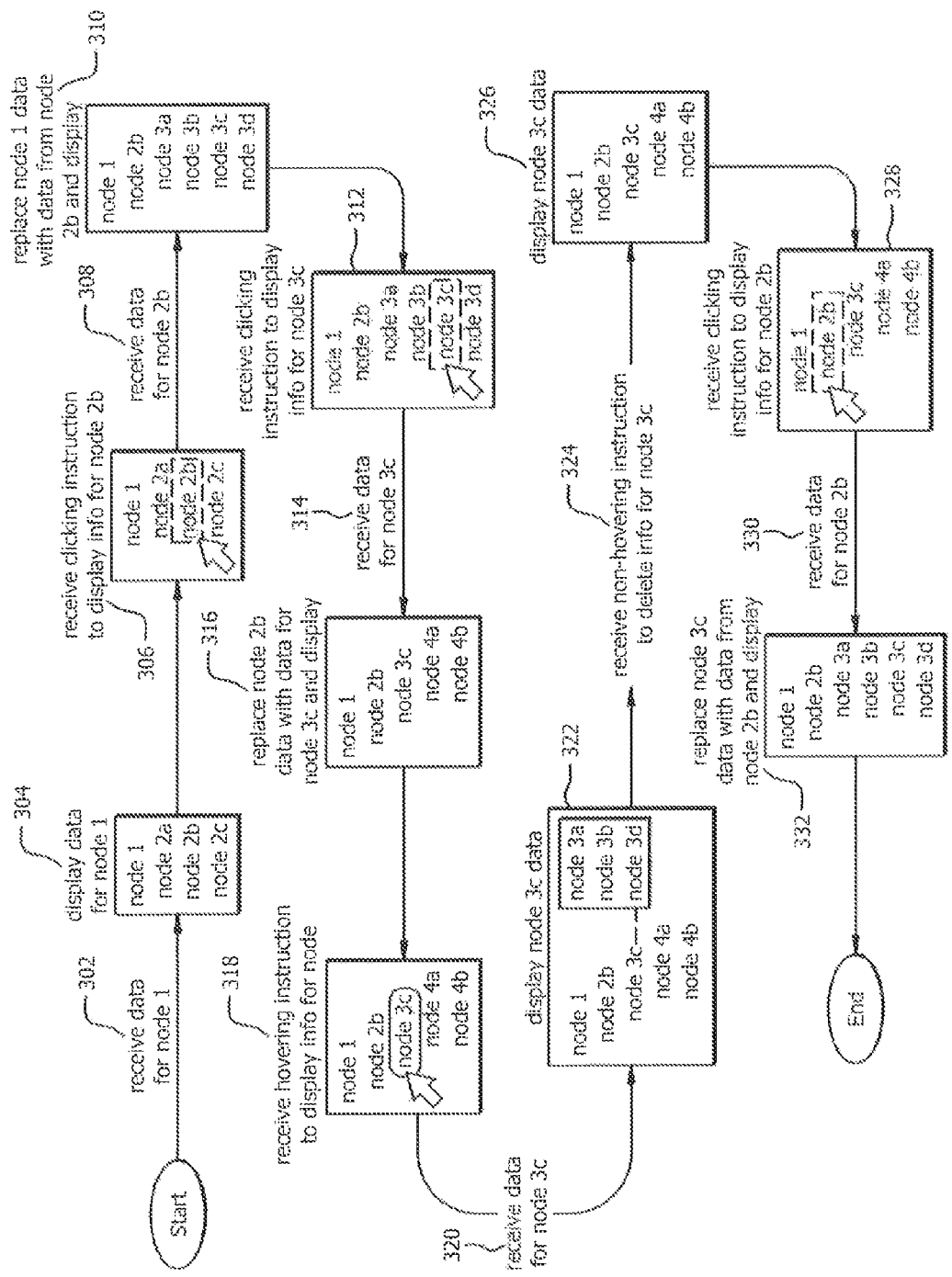
FIG. 3 illustrates an example of a state diagram that illustrates generating and navigating a bonsai tree hierarchical data structure.

Embodiments of the present invention and its advantages are best understood by referring to FIGS. 1-3, like numerals being used for like and corresponding parts of the various drawings.

Business enterprises often display data of a hierarchical nature in a "tree" format, where clicking on various branches of the tree displays the layers underneath that particular branch of the tree. However, as a user navigates further and further down the branches of the tree, the lists associated with each branch require the tree to expand larger. Eventually, a user has great difficulty in navigating to a higher level on the tree because the user is unable to see or easily identify the higher branches as the lists on each of the lower branches take up the majority of the space on the screen. The teachings of the disclosure recognize that it would be desirable to replace unnecessary data from a higher level with only the relevant data from the current level of the tree. This "trimming" of the normal tree structure creates an efficient and easily readable tree structure, similar to the trimmed branches of a bonsai tree.

FIG. 1 illustrates an example system that facilitates generating and navigating a bonsai tree hierarchical data structure. System 100 may include one or more databases 125, user devices 115, users 135, networks 120, and Bonsai Tree Generation Module (BTGM) 140. User devices 115, databases 125, and BTGMs 140 may be communicatively coupled by network 120.

In general, BTGM 140 may receive data in a hierarchical form from a memory. The data is displayed in a parent-child format. In an embodiment, BTGM 140 may display data associated with a parent. BTGM 140 may also receive an instruction to display data associated with a child and receive data associated with the child from the memory. The system may further replace data associated with the parent with data associated with the child, and display data associated with the child.

User device 115 may refer to any device that facilitates user 135 interacting with BTGM 140. In some embodiments, user device 115 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. User device 115 may also comprise any suitable user interface, such as a display, microphone, keyboard, or any other appropriate terminal equipment usable by user 135. User device 115 may comprise a graphical user interface (GUI) 116 operable to display information to user 135 and to receive instructions from user 135. User device 115 may also comprise a mouse that is operable to send instructions to user device 115, such as when user 135 clicks on data displayed on GUI 116 or hovers over data displayed on GUI 116. It will be understood that system 100 may comprise any number and combination of user devices 115. User 135 utilizes user device 115 to interact with BTGM 140 to display data associated with a parent or display data associated with a child, as described below. User device 115 may also communicate an instruction to BTGM 140 to display data associated with a child or with a parent.

Network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Database 125 may refer to any component capable of storing data in a hierarchical format, such as data that includes one or more parents and one or more children. For example, database 125 may store hierarchical data associated with employment, such as board of directors, top managers, senior managers, middle managers, and operational employees. As another example, database 125 may store hierarchical data associated with a Windows® system, such as computers, drives, folders, folders within folders, and files. As an additional example, database 125 may store data associated with a family tree, such as great grandparents, grandparents, parents, children, grandchildren, and great grandchildren. Examples of database 125 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1 illustrates database 125 as external to BTGM 140, it should be understood that database 125 may be internal or external to BTGM 140, depending on particular implementations. Also, database 125 may be separate from or integral to other memory devices to achieve any suitable arrangement of memory devices for use in system 100.

BTGM 140 may refer to any suitable combination of hardware and/or software implemented in one or more modules to process data and provide the described functions and operations. In some embodiments, the functions and operations described herein may be performed by a pool of BTGMs 140. In some embodiments, BTGM 140 may include, for example, a mainframe, server, host computer, workstation, web server, file server, a personal computer such as a laptop, or any other suitable device operable to process data. In some embodiments, BTGM 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, BTGM 140 receives an instruction to display data associated with a child or with a parent, receives data associated with the child or parent, and replaces the data currently visible with the received data associated with the child or parent. In some embodiments, BTGM 140 may include processor 155, memory 160, and an interface 165.

Memory 160 may refer to any suitable device capable of storing and facilitating retrieval of data and/or instructions. Examples of memory 160 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1 illustrates memory 160 as internal to BTGM 140, it should be understood that memory 160 may be internal or external to BTGM 140, depending on particular implementations. Also, memory 160 may be separate from or integral to other memory devices to achieve any suitable arrangement of memory devices for use in system 100.

Memory 160 is generally operable to store logic 162 and rules 164. Logic 162 generally refers to algorithms, code, tables, and/or other suitable instructions for performing the described functions and operations. Rules 164 generally refer to policies or directions for determining the instructions received and replacing the data on the screen with the data associated with the instructions. Rules 164 may be predetermined or predefined, but may also be updated or amended based on the needs of enterprise 110.

Memory 160 communicatively couples to processor 155. Processor 155 is generally operable to execute logic 162 stored in memory 160 to replace the data associated with the child with data associated with the parent and/or to replace the data associated with the parent with data associated with the child, according to the disclosure. Processor 155 may comprise any suitable combination of hardware and software implemented in one or more modules to execute instructions and manipulate data to perform the described functions for BTGM 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for BTGM 140, send output from BTGM 140, perform suitable processing of the input or output or both, communicate to other devices, or any combination of the preceding. Communication interface 165 may include appropriate hardware (e.g., modem, network interface card, etc.) and software, including protocol conversion and data processing capabilities, to communicate through network 120 or other communication system that allows BTGM 140 to communicate to other devices. Communication interface 165 may include any suitable software operable to access data from various devices such as user devices 115 and databases 125. Communication interface 165 may also include any suitable software operable to transmit data to various devices such as user devices 115. Communication interface 165 may include one or more ports, conversion software, or both. In general, communication interface 165 may receive data associated with the child or parent from database 125 and receive an instruction to display data associated with the child or parent.

In operation, logic 162 and rules 164, upon execution by processor 155, facilitate receiving data associated with the child or parent from database 125, replacing the data associated with the parent with data associated with the child, and replacing the data associated with the child with data associated with the parent. Logic 162 and rules 164 also facilitate determining whether the instruction received was a "hovering" instruction or a "clicking" instruction.

In general, BTGM 140 receives data in a hierarchical format from database 125. BTGM 140 may display the data in a tree format on GUI 116 of user device 115. When user 135 provides an instruction to user device 115, user device 115 sends the instruction to BTGM 140. BTGM 140 determines whether the instruction is a "clicking" instruction (e.g., user 135 used a mouse or pointer on GUI 116 to "click"

on an aspect of the tree) or a "hovering" instruction user 135 used a mouse or pointer on GUI 116 to "hover" over a branch of tree). If BTGM 140 determines the instruction was a clicking instruction, BTGM 140 may receive data from database 125 associated with the branch on which user 135 clicked. For example, if the parent currently displayed on GUI 116 is a senior manager and user 135 clicked on one of the seven middle managers (children) that directly report to the senior manager, then BTGM 140 will delete the data associated with the senior manager (e.g., all of the middle managers that report to the senior manager except for the one the user clicked on). BTGM 140 may replace that data associated with the senior manager with data associated with the middle manager that was clicked on, thus displaying all of the operational employees (children) that report to the middle manager (parent). If BTGM 140 determines the instruction is a "hovering" instruction over the senior manager (parent), BTGM 140 will show a horizontal navigation pane that displays information associated with the senior manager, for example, all of the peer senior managers (children) that report to the same top manager (parent).

Modifications, additions, or omissions may be made to the systems described herein without departing from the scope of the invention. For example, system 100 may include any number of users 135, user devices 115, databases 125, and BTGMs 140. As another example, particular functions, such as determining whether the instruction was a hovering instruction or a clicking instruction, may be performed by a separate component and BTGM 140 receives the information regarding the type of instruction received. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

FIG. 2 illustrates an example flowchart that facilitates generating and navigating a bonsai tree hierarchical data structure. At step 202, in some embodiments BTGM 140 receives data with the hierarchical nature from database 125. BTGM 140 may receive this data at interface 165 via network 120 from database 125. At step 204, in some embodiments, BTGM 140 may display data associated with a parent on GUI 116 of user device 115. In some embodiments, data associated with the parent is the children of the parent. For example, if the parent is manager 1, then the data associated with the parent would be the subordinates of manager 1, such as subordinate 1, subordinate 2 and subordinate 3.

At step 206, in some embodiments, BTGM 140 determines whether an instruction to display data is received. In some embodiments, BTGM 140 may constantly monitor whether an instruction is received or may perform this check after a certain amount of time (e.g., one second). If BTGM 140 determines an instruction to display data is not received, the method ends. If BTGM determines an instruction was received at step 206, then at step 208, BTGM 140 determines whether the instruction was a clicking instruction. If BTGM 140 at step 208 determines it was not a clicking instruction, then the method continues to step 210. If BTGM 140 determines at step 208 that it received a clicking instruction, then BTGM 140 continues to step 212.

At step 210, in some embodiments, BTGM 140 determines whether the instruction was a hovering instruction. For example, if user 135 places the mouse on GUI 116 of user device 115 over a piece of data display on the screen (e.g., a particular child or parent displayed in the bonsai tree), then BTGM 140 may determine that it received a hovering instruction. If BTGM 140 determines that there was a hovering instruction at step 210, it continues to step 212. If it determines it was not a hovering instruction, BTGM 140 returns to step 206 to determine whether an instruction to display data is received. Whether the instruction was a hovering instruction or a clicking instruction may determine what data is to be received, removed, included, replaced, and displayed in steps 216-224 and steps 226-234.

At step 212, in some embodiments, BTGM 140 determines whether the instruction requires BTGM 140 to display data associated with the child. For example, if GUI 116 shows a bonsai tree currently displaying board member 1, top manager 3, and three senior managers (senior manager 1, senior manager 2, and senior manager 3), and the instruction requires BTGM 140 to display data associated with senior manager 2, then the instruction requires BTGM 140 to display data associated with a child. If BTGM 140 determines that the instruction require BTGM 140 to display data associated with a child, BTGM 140 continues to step 216. If BTGM 140 determines that the instruction was not to display data associated with a child it continues to step 214 and determines whether the instruction says to display data associated with the parent. From the example above, if BTGM 140 receives an instruction to display data associated with board member 1, BTGM 140 would determine the instruction requires BTGM 140 to display data associated with a parent. If BTGM 140 at step 214 determines the instruction did not say to display data associated with the parent, the method ends. If it determines the instruction requires BTGM 140 to display data associated with the parent, then BTGM 140 continues to step 227.

At step 216, in some embodiments, BTGM 140 receives data associated with the child from database 125. The data associated with the child may be the children of the child in some embodiments or may be all children of the parent of the child. For example, if BTGM 140 in step 208 determines the instruction was a clicking instruction, then the data associated with the child in step 216 comprises the children of the child (e.g., all of the middle managers that report to the selected senior manager 2). If BTGM 140 determines in step 210 that the instruction is a hovering instruction, then the data associated with the child in step 216 may be the children of the parent. For example, if user 135 hovers over top manager 3, BTGM 140 will display the peer managers of top manager 3 (e.g., all of the top managers that report to board member 1, such as top managers 1, 2, 3, 4, and 5).

At step 218, in some embodiments, BTGM 140 removes the data associated with the parent from the display on user device 115. For example, if user 135 clicks on senior manager 2, BTGM 140 will remove the data associated with top manager 2 (e.g., all of the senior managers that report to top manager 2) and will not remove senior manager 2. At step 220, in some embodiments, BTGM 140 includes the data associated with the child on the display of device 115. Continuing the example, BTGM 140 would include the data associated with senior manager 2, such as all of the middle managers that report to senior manager 2 (e.g., middle managers 1 and 2). At step 222, in some embodiments, BTGM 140 replaces the data associated with the parent with data associated with the child. This can be performed using one or more of the techniques discussed above with respect to steps 218 and 220.

At step 224, in some embodiments, BTGM 140 displays the data associated with the child. If in step 208, BTGM 140 determines the instruction was a clicking instruction on senior manager 2, then BTGM 140 may display board member 1, top manager 2, senior manager 2, and middle manager 1 and 2. If in step 210 BTGM 140 determines the instruction was a hovering instruction over top manager 2, then BTGM 140 may display board member 1, top manager 2, senior managers 1, 2, and 3, and horizontally may show all of the top managers that directly report to board member 1 (e.g., all of the children of the parent of the selected child).

If in step 212 BTGM 140 determines the instruction was not to display data associated with a child and determines in step 214 that the instruction was to display data associated with a parent, then the method continues to step 226. At step 226, in some embodiments, BTGM 140 receives data associated with the parent from database 125. This step may be performed with techniques similar to those explained in step 216. For example, if the hierarchy shows board member 1, top manager 2, and senior managers 1, 2, and 3, and BTGM 140 determines it received a clicking instruction for board member 1, then BTGM 140 will receive data associated with board member 1. Steps 228 through 234 may be performed with techniques similar to steps 218 through 224 respectively. For example, after receiving a clicking instruction on board member 1, BTGM 140 will remove data associated with the top manager 2 (the child of top manager 2 including senior managers 1, 2, and 3), and replace that data with data associated with board member 1 (e.g., the parent of top manager 2). BTGM 140, at step 234, will display the data associated with board member 1 including all of the top managers that report directly to board member 1, such as top mangers 1, 2, 3, 4, and 5.

In general, by determining at step 214 that the instruction to display data is data associated with the parent, user 135 has selected to move up the hierarchy. By determining in step 212 that BTGM 140 has received an instruction to display data associated with the child, user 135 has used user device 115 to navigate down the hierarchy. By replacing data associated with the parent with data associated with the child, or vice versa. BTGM 140 displays a easily readable and logical tree that includes only data relevant to the current branch of the tree (e.g., branches directly above and branches directly below). After completing either step 224 or 234, the method ends.

Modifications, additions, or omissions may be made to the methods described herein without departing from the scope of the invention. For example, the steps may be combined, modified, or deleted where appropriate, and additional steps may be added. In an embodiment where BTGM 140 determines that a clicking instruction was received from user device 115, then determining whether the instruction was a hovering instruction at step 210 may be deleted. As another example, if BTGM 140 replaces the data associated with the parent with data associated with the child in step 222, then removing the data associated with the parent from the display and including the data associated with the child on the display in steps 218 and 220 may be removed. Additionally, the steps may be performed in any suitable order without departing from the scope of the present disclosure. While discussed as BTGM 140 performing the steps, any suitable component of system 100 may perform one or more steps of the method.

FIG. 3 illustrates an example state diagram that illustrates generating and navigating a bonsai tree hierarchical data structure. The system begins at state 302 where it receives data associated with node 1. At state 304, BTGM 140 displays data for node 1. For example, it will show the hierarchy of node 1 as the parent with the three children, node 2A, node 2B and node 2C.

At state 306, BTGM 140 may receive a clicking instruction from user device 115 to display information associated with node 2B. At state 308, BTGM 140 receives data for node 2B from database 125. At state 310, BTGM 140 replaces node 1 data with data from node 2B and displays the data. For example, the display on user device 115 may show the hierarchy of node 1, node 2B and the children of node 2B, which are node 3A, node 3B, node 3C and node 3D. Between state 306 and 310, BTGM 140 has removed the data associated with node 1 that is not related to the instruction (all of the children of node 1 that are not node 2B, e.g., node 2A and 2C).

At state 312, in some embodiments, BTGM 140 receives a clicking instruction to display information for node 3C. At state 314, BTGM 140 receives data for node 3C from database 125 at interface 165 via network 120. At state 316, BTGM 140 replaces node 2B data (e.g., the children of node 2B) with data for node 3C, which includes all of the children of node 3C (e.g., node 4A and 4B). At state 316, BTGM 140 displays this data on user device 115. For example, BTGM 140 will display node 1, node 2B, node 3C and the children of node 3C, which are node 4A and node 4B.

At state 318, in some embodiments, BTGM 140 receives a hovering instruction to display information for node 3C. At state 320, BTGM 140 receives data for node 3C and at state 322 BTGM 140 displays node 3C data horizontally to the hierarchy (e.g., the hierarchy displayed at state 318). For example, user device 115 will display node 1, node 2B, node 3C, node 4A and node 4B but will show a horizontal box next to node 3C that shows the peer nodes of node 3C (e.g., the children of node 2B that do not already appear in the hierarchy, which are node 3A, node 3B and node 3D).

At state 324, BTGM 140 receives a non-hovering instruction to delete information for node 3C. For example, user 135 may move the mouse from the display of node 3C on GUI 116 to communicate this command to BTGM 140. At state 326, BTGM 140 displays node 3C data without its peer data. For example the hierarchy will read node 1, node 2B, node 3C, node 4A, node 4B, (e.g., how it was displayed in state 316 before BTGM 140 received a hovering instruction). In other words, BTGM 140 deleted the peer data of node 3C (e.g., node 3A, node 3B, and node 3D, which was shown horizontally next to node 3C).

At state 328, in some embodiments, BTGM 140 may receive a clicking instruction to display information for node 2B. In some embodiments, BTGM 140 may recognize that this data was already displayed in state 310. Thus, BTGM 140 may access the data associated with node 2B that is locally stored (e.g., in RAM) rather than receive the data from database 125. In some embodiments, BTGM 140 has not locally stored the data for node 2B and thus at state 330, BTGM 140 receives data for node 2B from database 125. At state 332, in some embodiments, BTGM 140 replaces node 3C data with data from node 2B and displays the data on GUI 116 of user device 115. For example, the hierarchy of the display may now show node 1, node 2B, node 3A, node 3B, node 3C and node 3D because BTGM 140 replaced the data associated with node 3C (the child) with data associated with node 2B (the parent).

In general, user 135 may utilize GUI 116 of user device 115 to navigate up and down the hierarchy displayed on user device 115. User 135 may hover over display to create a horizontal list of peer nodes, and may also click on a node in horizontal list to then display the data associated with that node. User 135 may also navigate through the hierarchy by clicking on various nodes to receive data associated with that node, which replaces the previous data on the screen with data from the clicked node, and display the data associated with that node to user 135.

Modifications, additions, or omissions may be made to the states described herein without departing from the scope of the invention. For example, the states may be combined, modified, or deleted where appropriate, and additional states may be added. Additionally, the states may be performed in any suitable order without departing from the scope of the present disclosure. It will be understood that the state diagram in FIG. 3 is meant only as an example is should not be construed as limiting. While discussed as BTGM 140 performing the steps, any suitable component of system 100 may perform one or more steps of the method.

Certain embodiments of the present disclosure may provide one or more technical advantages. In one embodiment, the system reduces the number of queries necessary to identify information related to a certain level, thereby saving computational resources and additional time. In one embodiment, the system allows a hovering instruction to display data associated with a level in addition to maintaining the previously-displayed hierarchy, instead of requiring the user to navigate to the separate level and replacing the information in the hierarchy. This allows for the system to more efficiently use the space on the screen to display the necessary data without requiring the user to navigate to a different level before viewing the information related to the separate level.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A hierarchical navigation system, comprising:
a memory operable to store data in a hierarchical format, at least a portion of the memory being a random access memory;
an interface operable to:
display a first parent;
display data associated with the first parent, the data associated with the first parent comprising a first child and a second child;
one or more processors communicatively coupled to the memory and the interface and operable to:
receive the data in the hierarchical format from the memory;
receive an instruction to display;
determine whether the instruction to display comprises a clicking instruction to display data associated with the first child;
in response to determining that the instruction to display comprises the clicking instruction to display data associated with the first child:
determine whether the data associated with the first child is stored in the random access memory;
in response to determining that the data associated with the first child is stored in the random access memory, retrieve the data associated with the first child from the random access memory;
in response to determining that the data associated with the first child is not stored in the random access memory, receive the data associated with the first child from the memory;
remove the data associated with the first parent from the interface; and
replace the data associated with the first parent with the data associated with the first child;
determine whether the instruction to display comprises a hovering instruction above the first parent;
in response to determining that the instruction to display comprises a hovering instruction above the first parent:
display a horizontal list of data associated with a grandparent of the first parent, the horizontal list being directly adjacent to the first parent;
receive a clicking instruction on the horizontal list, the clicking instruction being one to display data associated with a second parent, the second parent being one of the data associated with the grandparent; and
in response to receiving the clicking instruction:
remove the data associated with the first parent from the interface; and
replace the data associated with the first parent with the data associated with the second parent.

2. The system of claim 1, wherein removing the data associated with the first parent from the interface comprises removing an indication of the second child from the interface.

3. The system of claim 1, further comprising:
determining that the instruction to display does not comprise the hovering instruction above the first parent; and
in response to determining that the instruction to display does not comprise the hovering instruction above the first parent, removing from the interface the horizontal list of data associated with the grandparent of the first parent.

4. The system of claim 1, wherein replacing the data associated with the first parent with data associated with the first child comprises:
removing the data associated with the first parent from the interface; and
inserting the data associated with the first child on the interface.

5. The system of claim 1, wherein the data associated with the first parent comprises all children of the first parent.

6. The system of claim 1, wherein the data associated with the first child comprises all children of the first child.

7. A non-transitory computer-readable medium encoded with logic, the logic operable when executed to:
receive data in a hierarchical format from a memory, at least a portion of the memory being a random access memory;
display a first parent;
display data associated with the first parent, the data associated with the first parent comprising a first child and a second child;
receive an instruction to display;
determine whether the instruction to display comprises a clicking instruction to display data associated with the first child;
in response to determining that the instruction to display comprises the clicking instruction to display data associated with the first child:
determine whether the data associated with the first child is stored in the random access memory;
in response to determining that the data associated with the first child is stored in the random access memory, retrieve the data associated with the first child from the random access memory;

in response to determining that the data associated with the first child is not stored in the random access memory, receive the data associated with the first child from the memory;
remove the data associated with the first parent from the interface; and
replace the data associated with the first parent with the data associated with the first child;
determine whether the instruction to display comprises a hovering instruction above the first parent;
in response to determining that the instruction to display comprises a hovering instruction above the first parent:
   display a horizontal list of data associated with a grandparent of the first parent, the horizontal list being directly adjacent to the first parent;
   receive a clicking instruction on the horizontal list, the clicking instruction being one to display data associated with a second parent, the second parent being one of the data associated with the grandparent; and
   in response to receiving the clicking instruction:
     remove the data associated with the first parent from the interface; and
     replace the data associated with the first parent with the data associated with the second parent.

8. The computer-readable medium of claim 7, wherein removing the data associated with the first parent from the interface comprises removing an indication of the second child from the interface.

9. The computer-readable medium of claim 7, wherein the logic is further operable to:
determine that the instruction to display does not comprise the hovering instruction above the first parent; and
in response to determining that the instruction to display does not comprise the hovering instruction to display the data associated with the first parent, removing from the interface the horizontal list of data associated with the grandparent of the first parent.

10. The computer-readable medium of claim 7, wherein replacing the data associated with the first parent with the data associated with the first child comprises:
removing the data associated with the first parent from an interface; and
inserting the data associated with the first child on the interface.

11. The computer-readable medium of claim 10, wherein the data associated with the first parent comprises all children of the first parent.

12. A hierarchical navigation method, comprising:
receiving data in a hierarchical format from a memory, at least a portion of the memory being a random access memory;
displaying, at an interface, a first parent;
displaying, at the interface, data associated with the first parent, the data associated with the first parent comprising a first child and a second child;
receiving an instruction to display;
determining whether the instruction to display comprises a clicking instruction to display data associated with the first child;
in response to determining that the instruction to display comprises the clicking instruction to display data associated with the first child:
   determining whether the data associated with the first child is stored in the random access memory;
   in response to determining that the data associated with the first child is stored in the random access memory, retrieve the data associated with the first child from the random access memory;
   in response to determining that the data associated with the first child is not stored in the random access memory, receiving the data associated with the first child from the memory;
   removing the data associated with the first parent from the interface; and
   replacing the data associated with the first parent with the data associated with the first child; and
   displaying, at the interface, the data associated with the first child;
determining whether the instruction to display comprises a hovering instruction above the first parent;
in response to determining that the instruction to display comprises a hovering instruction above the first parent:
   displaying a horizontal list of data associated with a grandparent of the first parent, the horizontal list being directly adjacent to the first parent;
   receiving a clicking instruction on the horizontal list, the clicking instruction being one to display data associated with a second parent, the second parent being one of the data associated with the grandparent; and
   in response to receiving the clicking instruction:
     removing the data associated with the first parent from the interface; and
     replacing the data associated with the first parent with the data associated with the second parent.

13. The method of claim 12, wherein removing the data associated with the first parent from the interface comprises removing an indication of the second child from the interface.

14. The method of claim 12 further comprising:
determining that the instruction to display does not comprise the hovering instruction above the first parent; and
in response to determining that the instruction to display does not comprise the hovering instruction above the first parent, removing from the interface the horizontal list of data associated with the grandparent of the first parent.

15. The method of claim 12, wherein replacing the data associated with the first parent with the data associated with the first child comprises:
removing the data associated with the first parent from the interface; and
inserting the data associated with the first child on the interface.

16. The method of claim 12, wherein the data associated with the first parent comprises all children of the first parent.

17. The method of claim 12, where in the data associated with the first child comprises all children of the first child.

* * * * *